3,382,920
RADIATOR STRUCTURE WITH VARIABLE EMISSIVITY

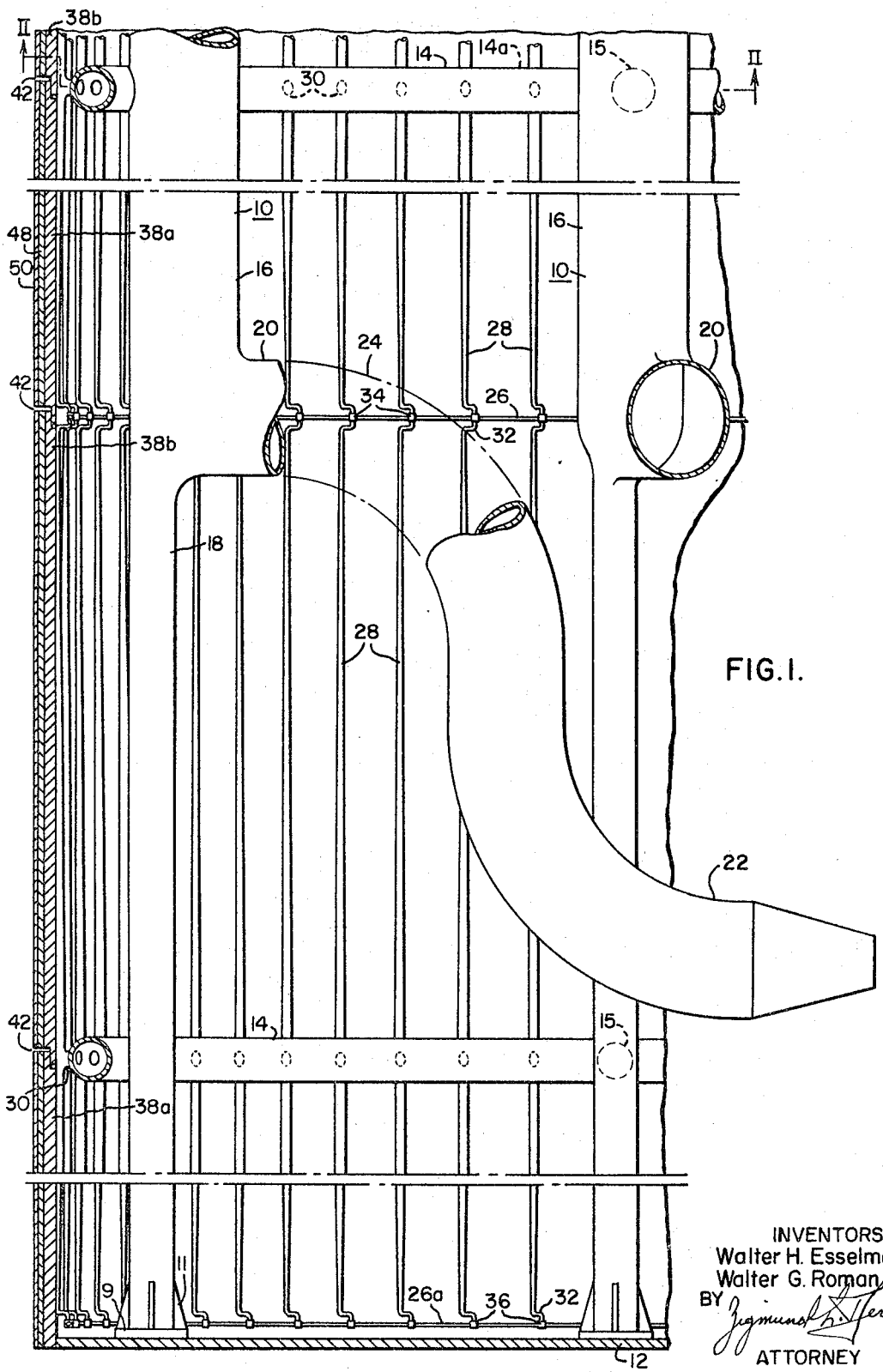
FIG.I.
INVENTORS
Walter H. Esselman &
Walter G. Roman
BY
ATTORNEY

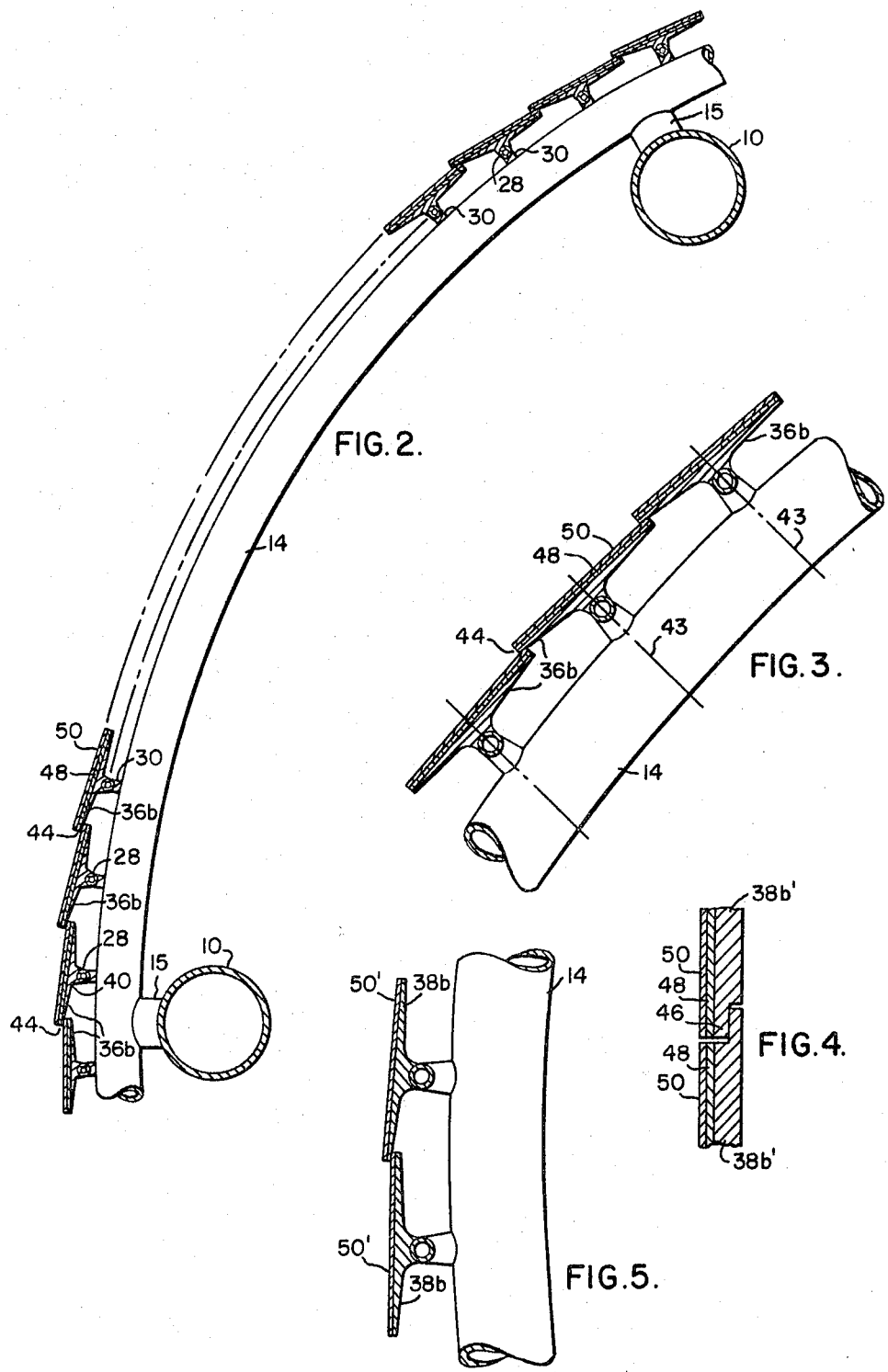

Walter H. Esselman and Walter G. Roman, Pittsburgh, Pa., assignors to Westinghouse Electric Corporation, Pittsburgh, Pa., a corporation of Pennsylvania
Filed Mar. 16, 1965, Ser. No. 440,113
13 Claims. (Cl. 165—133)

The present invention relates to a radiator structure including means associated therewith for varying the emissivity of the radiative surfaces in order to meet successively encountered radiational and/or operating conditions. More particularly, the invention relates to a radiator structure of the character described which can be utilized under conditions prevailing in outer space or in the upper reaches of the atmosphere wherein virtually any external heat transfer relative to an orbital or ballistic body occurs through thermal radiation.

In certain types of space vehicles, auxiliary power supply units are utilized, or are contemplated for such use, which require an efficient means for disposing of considerable quantities of waste heat. A very efficient radiator is required therefor, since the heat must be dissipated in the vacuum of outer space. However, due to the nature of the auxiliary power supply, use is required of coolant materials whose melting points are higher than the equilibrium temperature which the radiator will assume when not operating. As a result, before the auxiliary power supply can be placed in active use, this required efficiency of the waste heat radiator causes the temperature thereof to fall below the melting point of the coolant, with the result that circulation of the coolant is impeded or stopped altogether.

The problem outlined above becomes more aggravated when the auxiliary power supply is furnished in the form of a nuclear reactor. In view of safety considerations, it is highly undesirable to commence operation of this type of power supply until the space vehicle is in orbit, in the case of an artificial satellite, or until the vehicle has left the gravitational pull of the earth in the case of an interplanetary vehicle, or in other words when the acceleration imparted to the vehicle by the rocket booster has ceased. However, by this time the waste heat radiator has dissipated sufficient heat to cause the power supply coolant to freeze within the radiator structure and to nullify the functioning thereof.

As an environmental example not limitative of the invention, it will be assumed that the coolant selected for the auxiliary power supply unit is sodium having a melting point of about 200° F. The sodium metal, when liquid, is circulated through a radiator whose radiative surfaces are coated with a material having high thermal emissivity in the infrared range. Such materials, although necessarily required to dispose of the anticipated quantity of waste heat solely through radiation, readily radiate heat to empty space from a body at moderate or low temperatures, say in the order of 100° F. or less. As a result, the space vehicle, when coated with one of the aforementioned materials, cannot absorb sufficient solar radiation to acquire an equilibrium radiator temperature above the melting point of sodium. Consequently, at least that portion of the power supply coolant which is disposed within the radiator structure will freeze or solidify to prevent circulation of coolant through the power supply, unless heat is supplied to the radiator from another source.

The same considerations will apply regardless of the coolant and radiator surface materials selected, so long as the normal or operating emissivity of the radiator material or coating is sufficiently high to cause the radiator temperature to drop below the melting point of its selected coolant before the auxiliary supply is intended to be operated.

The present invention solves the aforesaid problem by controlling the initial emissivity of the radiative surfaces of the radiator structure such that, prior to initial operation of the auxiliary power supply, the radiator will readily absorb sufficient solar radiation to attain an equilibrium temperature above the freezing or melting point of contained coolant.

Briefly, this is accomplished in accordance with the invention by coating the radiative surfaces of high infrared emissivity with a material having a relatively higher emissivity in the solar radiation spectrum. Metals generally have greater emissivity in the solar radiation spectrum than in the infrared spectrum. Therefore, a metallic radiative surface or one with a metallic coating thereon will more readily absorb heat from the sun and will with difficulty radiate this heat in the infrared range. Accordingly, the radiative surface will attain an equilibrium temperature in the order of 300° F. or higher which is above the melting points of most of the desirable coolant materials selected for this application. This invention presents a unique radiator structure wherein the desired characteristics of high infrared emissivity when the radiator is dumping waste heat and high solar emissivity during the pre-operative period are combined.

In view of the foregoing, an object of the present invention is the provision of a radiator structure having variable emissivity.

Another object of the invention is the provision of a radiator structure having means associated therewith for altering the emissivity thereof in response to operating conditions.

Still another object of the invention is the provision of a waste heat radiator suitable for use in connection with space vehicles wherein the emissivity of the radiated surfaces thereof is readily variable.

A further object of the invention is the provision of a radiator structure for use with space vehicles which structure combines a functional meteorite shield or bumper with a waste heat radiative surface forming part thereof and exhibiting the characteristic of variable emissivity in response to differing operating conditions.

A still further object of the invention is the provision of a radiator structure for use with a space vehicle in which structure radiating fins are disposed and shaped to provide a meteorite bumper for the space vehicle and are provided with means for altering the emissivity of the structure.

Another object of the invention is the provision of a composite radiative body or surface, which is fabricated from or coated with a first thermally emissive material whose emissivity is most efficient in a given spectral range and wherein a second or expendable coating is applied to the first material, whose emissivity is maximized in a differing spectral range so that the emissivity of the radiative body is altered upon a change in operating conditions. Specifically, the invention provides a composite radiative means wherein the aforementioned second material has an appreciable vapor pressure at radiator operating temperatures and thus is eliminated by evaporation after a predetermined period of radiator operation to change the emissivity.

The above and other objects, features and advantages of the invention will become apparent from the following detailed description taken in conjunction with the accompanying drawings, in which:

FIGURE 1 is a partial, longitudinally sectioned view of a radiator structure arranged in accordance with the invention;

FIG. 2 is a cross-sectional view of the radiator portion shown in FIG. 1 and taken along reference line II—II thereof;

FIG. 3 is an enlarged cross-sectional view of a portion of the radiator structure as illustrated in FIG. 2;

FIG. 4 is an enlarged cross-sectional view of a portion of the radiator structure of FIG. 2 showing a modified radiating fin arrangement; and FIG. 5 is a presentation similar to that of FIG. 4 but showing another arrangement of the composite radiative surface structure.

Referring now to the drawings, and particularly to FIGS. 1–3 thereof, the illustrative radiator structure of the invention includes a plurality of longitudinally extending tubular vapor headers 10 spaced equidistantly about the circumference of the generally cylindrical radiator structure. Each of the longitudinal vapor headers 10 extends the length of the radiator structure and each end thereof is joined and sealed to respective end plate closures, with one such end plate 12 being illustrated in FIG. 1.

In furtherance of this purpose, the ends of the longitudinal vapor headers 10 are joined respectively to a like number of generally circular cap members 9, which are welded to the ends of the longitudinal headers 10 and structurally welded to the adjacent end plate 12. The junction thus formed between the longitudinal header end and the end plate 12 is reinforced at each longitudinal header end by a number of fillet plates 11 which are likewise structurally welded to the cap members 9 and to the end portions of the longitudinal vapor headers 10.

In this arrangement of the invention, six such longitudinal vapor headers 10 are employed and each is joined in communication to a plurality of circumferentially extending vapor headers 14 spaced equidistantly along the length of the radiator structure. In the illustrated form of the invention, the circumferential vapor headers are employed in conjunction with the six longitudinal vapor headers 10 to form a skeletal framework of the radiator structure according to the invention. As better shown in FIG. 2 of the drawings, each circumferential vapor header 14 is joined to all of the longitudinal vapor headers 10 by means of short tubular segments 15, which are welded respectively at suitable adjacent openings in the longitudinal and circumferential headers.

Inasmuch as only an end portion of the radiator structure is shown herein due to space limitations, each of the longitudinal vapor headers 10 comprises an intermediate enlarged conduit portion 16 in order to accommodate the combined volumes of the intermediate circumferential vapor headers including the header 14a. At the junction of the enlarged vapor header intermediate portion 16 and a reduced end portion 18 thereof (to which, in this arrangement, only one circumferential vapor header 14 is joined), an inlet vapor opening 20 is provided for each longitudinal header 10. The openings 20, then, are connected to a turbine exhaust indicated schematically by the reference character 22, as denoted by the dashed conduit outlines 24.

Having thus described the dual structural and circulatory functionality of the vapor headers 10–14, attention now will be given to the novel condensate return and radiative functions of the radiator structure. First, with reference to the condensate return structure of the radiator system, a plurality of circumferential condensate headers 26 are disposed adjacent the end plates 12 and at additional positions spaced along the length of the radiator structure. In this arrangement of the invention, the condensate headers 26 also are spaced at positions equidistantly along the length of the radiator structure. Desirably also the condensate headers 26 are disposed equidistantly from adjacent circumferential vapor headers 14 in order to provide uniformity in the length of the cooling or condensate tubes 28 which extend from each circumferential vapor header 14 longitudinally in opposite directions therefrom to both of the adjacent circumferential condensate headers 26, as the case may be. At each circumferential vapor header 14 the cooling tubes 28 are coupled respectively thereto by means of short conduit sections 30. The cooling tubes 28 can be tapered, to reduce the overall weight of the radiator structure, toward the condensate headers inasmuch as the fluid volume is decreasing due to condensation. Each end of each cooling tube 28 is provided with a double bend portion 32 in order that the condensate header 26 is displaced inwardly of the radiator fin structure presently to be described. This inward displacement facilitates assembly of the radiator structure when making the necessary connections between the cooling tubes 28 and the respective condensate headers 26 through the use of cross fittings 34, or T fittings 36 as in the case of the endmost condensate headers, with one such end header 26a being shown in FIG. 1 of the drawings.

When thus assembled, the cooling tubes 28 are supported at their mid-sections where they are joined to the associated circumferential vapor header 14 and at their ends by the related condensate headers 26. The cooling tubes are further supported throughout their lengths by the radiator fin structure described below, all of which affords adequate structural support and strength against longitudinal bending forces which may be imparted to the radiator structure.

In order to provide an emissive surface for the radiator structure each cooling tube 28, which, as indicated above, extends unbrokenly between adjacent condensate headers 26 in this example, is provided with a pair of meteorite shield members or radiator fins 38a and 38b. As shown in FIG. 1, two such finned shield members 38a and 38b are arranged tandemly along the length of each cooling tube 28 and, as better shown in FIG. 2, are joined structurally in good heat conductive relationship to the associated cooling tube as by fillet weldments 40 extending along the length of the cooling tube 28. The end portions of the shield members 38a and 38b, at their engaging ends, are stepped complementarily so as to form a slidable lap joint denoted generally by the reference character 42. The lap joints 42 allow for thermal expansion and contraction of the shield members 38a and 38b while at the same time eliminate any line-of-sight gap between adjacent members and the possibility of admission of meteorite particles.

In one arrangement of the invention, as better shown in FIG. 3, the shield members 38a and 38b are tilted slightly with respect to radii 43 passing respectively therethrough so that one lateral edge portion overlies the similar portion of the adjacent shield member while the other lateral edge portion underlies the similar portion of the other adjacent shield member. This arrangement, denoted generally by reference characters 44, accommodates thermal expansion and contraction of the finned members and of other radiator components and also affords maximum meteorite protection in the manner described previously in connection with the lapped end joints 42.

As better shown in FIG. 4 of the drawings, the lateral junctions 44 can be formed from complementarily stepped configurations in the manner described above in connection with the end junctions 42 of the shield members. In the latter arrangement, the stepped portions and the lapped junction 46 formed thereby will coextend with the length of the individual shield members 38a and 38b.

When so arranged, the shield members 38a and 38b extend completely around the circumference of the radiator structure in the manner illustrated in FIG. 2, and completely along the entire length of the radiator structure in the manner shown in FIG. 1. The shield members 38a and 38b thus form a meteorite shield or bumper extending about the circumference of the radiator structure. To reduce the total weight of the meteorite bumper, each of the shield members 38a or 38b desirably is tapered toward its lateral edges, as shown more clearly in FIG. 2 of the drawings.

As indicated above, in the illustrative application of the invention, the radiator structure is adapted to handle the effluent of a turbine which, in turn, is operated by a nuclear auxiliary power supply. In order to afford adequate heat dissipation to empty space under operating conditions, the power supply is operated at a temperature in the neighborhood of 1000° F. to 1300° F. Because of weight considerations, the conduits comprising the coolant circuit of the power supply must be of comparatively lightweight tubing, which of course minimizes the pressurization to which a given coolant can be subjected. The available coolant pressures then, more or less, dictate the use of the so-called liquid metals, such as sodium, potassium, and sodium-potassium alloy (NaK). It is contemplated, however, that other coolant materials can be utilized, which are fluid at the required operating temperature range.

In order to obtain a high emissivity in the infrared range corresponding to the aforementioned operating temperatures, the finned shield members 38a and 38b desirably are coated with a high emissivity coating of metallic oxides or a carbon dispersion in a glassy enamel matrix.

In the following table a number of suitable oxide, ceramic or cermet materials, as the case may be, are listed together with their emissivities which correspond to the indicated temperature ranges, and also their maximum operating temperatures.

TABLE I.—HIGH EMISSIVITY COATINGS OF METALLIC OXIDES

| Material | Coefficient of Emissivity | Corresponding Temperature, °F. | Maximum Operating Temperature, °F. |
| --- | --- | --- | --- |
| Nickel oxide | 0.59–0.86 | 1,200–2,290 | 2,300 |
| Alumina+29% Fe | 0.78–0.68 | 1,850–2,850 | 2,850+ |
| Cuprous oxide | 0.66–0.54 | 1,470–2,010 | 2,010+ |
| Iron oxide | 0.78–0.82 | 260–980 | 2,000+ |
| Nichrome, oxidized | 0.95–0.98 | 120–930 | 2,000+ |
| Stainless Steel, oxidized | 0.6–0.7 | 450–1,600 | 1,800+ |

Similar characteristics of the aforementioned carbon-glassy enamel together with other carbon and graphite materials are listed below:

TABLE II.—CARBON AND GRAPHITE MATERIALS

| Material | Coefficient of Emissivity | Corresponding Temperature, °F. | Maximum Operating Temperature, °F. |
| --- | --- | --- | --- |
| Lamp black-Water glass | 0.95 | 70–700 | 700 |
| Carbon plate | 0.81–0.79 | 260–1,160 | (¹) |
| Cargon cements | 0.8 | | 2,600 |
| Graphite cements | 0.8 | | 2,600 |
| Carbon-Epoxy Cement | 0.8 | | 500 |
| Cargon in glassy enamel | 0.9 | | (²) |

¹ Depends on adhesive.
² Enamel melting or spalling.

It is to be understood however that the aforementioned listings of useful emissive materials are not to be construed as limitative of the invention. Other materials useful in the invention will occur to workers in the art or will be discovered from time-to-time all of which obviously can serve as one of the components of the composite radiative arrangement described in more detail below.

Each of the finned shield segments 38a or 38b is provided with a coating or layer 48 of one or more of the aforementioned oxides or carbon materials, or the equivalent. Alternatively, where the desired emissive material has sufficient structural strength, as in the case of certain of the cermets, the finned shield members 38a and 38b can be fabricated entirely from such material. Where a separate coating 48 of the basic emissive material is utilized, the same can be applied by conventional coating techniques, as by dipping, spraying, evaporative deposition and so on.

The structure described thus far serves as a very efficient and effective combination radiator and meteorite bumper. However, as indicated above preliminarily, use of one of the aforelisted materials or combinations thereof or of similarly suited materials, radiates heat so efficiently, even in the near perfect vacuum of outer space, that the temperature of the radiator structure falls sufficiently low prior to the initial operation of the power supply unit that the coolant which must be used therefor freezes or solidifies. Starting up the power supply under these conditions is, of course, hazardous, and vastly more so in the case of a nuclear power unit.

As noted previously, the invention contemplates the provision of means associated with the radiative surfaces, or the coating 48 when utilized, of the radiator structure which will maintain the temperature of the structure above the melting point of the coolant material employed therein. One arrangement for accomplishing this desired result, in accordance with the invention, is the provision of an additional layer or coating 50 (FIGS. 1–4) which coextensively overlies the basic emissive coating 48 and which will change the emissivity of the basic radiative coating 48 during the initial portion of the space flight, i.e., when the auxiliary power supply is not operating. As better shown in FIG. 5, the last-mentioned layer can be provided as a single coating layer 50' deposited directly upon the radiative surfaces of the finned members 38a and 38b in the case where the finned shield members are fabricated from an emissive material.

Since different materials have differing spectra for optimum emission (or absorption) of heat, a metallic material desirably is selected for the coating 50 or 50'. In this example, metals generally exhibit higher emissivity under conditions wherein the entire solar radiation spectral range is encountered, particularly when the radiator structure is exposed to the undiminished solar radiation of outer space. Thus, a metallic body or one with a metallic coating will more readily absorb heat from the sun and will with relative difficulty radiate this heat in the infrared spectral ranges. With the metallic coating, or a coating of equivalent material which has a similarly appreciable vapor pressure at radiator operating conditions, the radiator structure will maintain a temperature, by solar absorption, in the neighborhood of 300° F. before initial operation of the nuclear power unit. The coating 50 or 50' desirably is applied thinly as by spraying, plating, evaporative deposition or by other suitable means. The coating need not necessarily be smooth or polished but desirably should be thin and have an appreciable vapor pressure at vehicle operating temperatures so that it will evaporate off the radiator surface, as the radiator is being brought up to the operating temperature of the power supply. Thus, as the operating temperature of the power system is approached, the emissivity of the radiative surface is altered from a relatively low emissivity to one which is sufficiently high to afford adequate disposal of the waste heat.

Suitable materials for use as the coating 50 or 50' are listed below:

TABLE III.—EVAPORATIVE METAL COATINGS

| Material | Coefficient of Emissivity | Corresponding Temperature, °F. | Maximum Operating Temperature, °F. |
| --- | --- | --- | --- |
| Zinc | 0.05 | 440–620 | 700 |
| Tin | 0.04–0.06 | 76 | 400 |
| Lead | 0.06–0.08 | 260–440 | 600 |
| Lead (oxidized)¹ | .28 | 75 | 600 |
| Aluminum | 0.04–0.06 | 440–1,070 | 1,200 |
| Cerro alloys | 0.07 | 70–300 | 140–400 |

¹ Given primarily to show the desirability of keeping the radiative surface bright.

As pointed out previously in connection with Tables I and II, it is to be understood that other equivalent materials for use in the composite structure of the invention can be employed.

Although the invention has been shown in connection with certain specific embodiments, it will be readily apparent to those skilled in the art that various changes in form and arrangement of parts may be made to suit requirements without departing from the spirit and scope of the invention. For example, it is not essential to the invention that the power supply subject its coolant to a vaporization-condensation cycle, since it is readily apparent that the inventive arrangement will function without changes in coolant state between vapor and liquid.

We claim as our invention:

1. A radiator structure having an outer surface exposed to the ambient, means for supplying heat to said radiator and means for altering the emissivity of said radiator structure to the ambient comprising, a first thermally emissive material coated on said surface, said first emissive material comprising at least a substantial portion of an oxide material having a relatively high coefficient of emissivity, a second emissive material coated on said first emissive material and substantially coextending therewith, said second emissive material comprising substantially a metallic material having a relatively low coefficient of emissivity and having an appreciable vapor pressure at the operating temperature of said radiator structure so that said second emissive material is evaporated from said radiative surface after a period of operation of said radiator structure whereby the emissivity of said structure is altered after said operational period.

2. A radiator structure having an outer surface exposed to the ambient, means for supplying heat to said radiator and means for altering the emissivity of said radiator structure to the ambient comprising, a first thermally emissive material having a relatively low vapor pressure coated on said surface, a second thermally emissive material coated on said first thermally emissive material, said second emissive material having a substantially lower coefficient of emissivity than that of said first emissive material, and said second emissive material having the property which causes it to evaporate in a vacuum environment to expose said first emissive material, when said structure is placed in a vacuum environment.

3. A radiator structure having an outer surface exposed to the ambient, means for supplying heat to said radiator and means for altering the emissivity of said radiator structure to the ambient, said radiator structure being formed from a first thermally emissive material comprising at least a substantial portion of an oxide material having a relatively high coefficient of emissivity, a second emissive material coated on said first emissive material and substantially coextending therewith, said second emissive material comprising substantially a metallic material having a relatively low coefficent of emissivity and having an appreciable vapor pressure at the operating temperature of said radiator structure so that said second emissive material is evaporated from said radiative surface after a period of operation of said radiator structure whereby the emissivity of said structure is altered after said operational period.

4. A radiator structure having an outer surface exposed to the ambient, means for supplying heat to said radiator and means for altering the emissivity of said radiator structure to the ambient, said radiator structure being formed from a first thermally emissive material having a relatively low vapor pressure, a second thermally emissive material coated on said surface of said radiator structure, said second emissive material having a substantially lower coefficient of emissivity than that of said first emissive material, and said second emissive material having the property which causes it to evaporate in a vacuum environment to expose said first emissive material, when said structure is placed in a vacuum environment.

5. In a radiator structure, the combination comprising an array of generally parallel cooling tubes, means for supplying a heated cooling fluid to said tubes and for removing cooled fluid therefrom, finned radiative means secured to each of said tubes in good heat transfer relation therewith and extending substantially along the length thereof, a first thermally emissive material having a relatively low vapor pressure forming at least part of said finned means and being substantially coextensive with the surface thereof, and a second emissive material coated upon said first emissive material and being substantially coextensive therewith, said second emissive material having a substantially lower coefficient of emissivity than that of said first emissive material, and said second emissive material having the property which causes it to evaporate in a vacuum environment to expose said first emissive material, when said structure is placed in a vacuum environment.

6. In a radiator structure, the combination comprising a plurality of generally parallel cooling tubes, means for supplying a heated fluid material to said tubes and for removing cooled fluid therefrom, a plurality of finned members mounted on each of said tubes in good heat transfer relation therewith and extending along the length thereof in end-to-end abutting relation, expansion joint means forming part of each pair of abutting ends of said members to accommodate thermal expansion and contraction of said members, a first thermally emissive material having a relatively low vapor pressure forming at least part of each of said finned members and coextending with the outer surfaces thereof, a second emissive material coated on said first emissive material and coextending substantially therewith, said second emissive material having a substantially lower coefficient of emissivity than that of said first emissive material, and said second material having the property which causes it to evaporate in a vacuum environment to expose said first emissive material, when said structure is placed in a vacuum environment.

7. In a radiator structure, the combination comprising a plurality of relatively closely spaced generally parallel cooling tubes, means for supplying a quantity of heated fluid to said tubes and for removing cooled fluid therefrom, a plurality of finned members mounted on each of said cooling tubes in good heat transfer relation therewith and extending substantially along the length thereof in end-to-end abutting relation, the lateral edge portions of the finned members associated with each of said cooling tubes being in substantial engagement with the respective lateral edge portions of those finned members on adjacent cooling tubes so as to afford a substantially continuous radiative surface of said radiator structure, a first thermally emissive material having a relatively low vapor pressure forming at least part of said finned members and substantially coextending with the surfaces thereof, a second emissive material coated on said first emissive material and substantially coextending therewith, said second emissive material having a lower coefficient of emissivity than that of said first emissive material, and said second emissive material having the property which causes it to evaporate in a vacuum environment to expose said first emissive material, when said structure is placed in a vacuum environment.

8. A composite radiative member shaped for use in a radiator structure, said member comprising a first thermally emissive material having a relatively low vapor pressure forming at least part of said member and substantially coextending with the radiative surface thereof, a second emissive material coated upon said first material and substantially coextending therewith, the coefficient of emissivity of said second emissive material being substantially lower from that of said first emissive material, and said second emissive material having the property which causes it to evaporate in a vacuum environment to expose said first emissive material, when said member is placed in a vacuum environment.

9. A composite radiative member shaped for use in a radiator structure, said member having a first thermally emissive material having a relatively low vapor pressure coated on its radiative surface and substantially coextending therewith, a second emissive material coated upon said first emissive material and in turn substantially coextending therewith, said second emissive material having a substantially lower coefficient of emissivity than that of said first emissive material, said second emissive material having the property which causes it to evaporate in a vacuum environment to expose said first emissive material, when said member is placed in a vacuum environment.

10. A finned radiative member shaped for use in a radiator structure, said finned member having a first thermally emissive material forming at least part of its radiative surface and substantially coextending therewith, a second emissive material coated upon said first emissive material and substantially coextending therewith, the coefficient of emissivity of said second emissive material being substantially lower than that of said first emissive material, said second emissive material being relatively thin and having the property which causes it to evaporate in a vacuum environment to expose said first emissive material, when said member is placed in a vacuum environment.

11. In a radiator structure, the combination comprising a plurality of generally parallel cooling tubes arranged in a generally cylindrical array, means contained within said array for supplying a heated fluid to said cooling tubes and for removing cooled fluid therefrom, a plurality of finned radiative members secured in good heat transfer relation to said cooling tubes and extending substantially along the length thereof, a first thermally emissive material having a relatively low vapor pressure forming at least part of said finned members and coextending substantially with the radiative surfaces thereof, a second emissive material coated on said first emissive material and substantially coextending therewith, said second emissive material having a substantially lower coefficient of emissivity from that of said first emissive material, said second emissive material having the property which causes it to evaporate in a vacuum environment to expose said first emissive material, when said structure is placed in a vacuum environment, the lateral edge portions of each of said finned members substantially engaging the respective lateral edge portions of adjacent finned members so that said finned members together comprise a continuous radiative surface substantially coextending with the entire circumference of said radiator structure and in addition comprise a mechanical shield arrangement for said supplying and removing means and the like contained within said radiator structure.

12. In a radiator structure, the combination comprising a plurality of generally parallel cooling tubes, means for supplying a heated fluid to said cooling tubes and for removing cooled fluid therefrom, an elongated finned radiator structure secured in good heat transfer relation to said tubes and extending substantially along the length thereof, a first thermally emissive material forming at least part of said finned structure and substantially coextending with the radiative surface thereof, said first emissive material comprising at least a substantial portion of an oxide material having a relatively high coefficient of emissivity, a second emissive material coated on said first emissive material and substantially coextending therewith, said second emissive material comprising substantially a metallic material having a relatively low coefficient of emissivity and having an appreciable vapor pressure at the operating temperature of said radiator structure so that said second emissive material is evaporated from said radiative surface after a period of operation of said radiator structure whereby the emissivity of said structure is altered after said operational period.

13. A generally cylindrical radiator structure comprising a plurality of generally parallel cooling tubes arranged in a cylindrical array, a plurality of circumferential conduit headers spaced along the length of said radiator structure, said circumferential headers being rigidly joined to each of said cooling tubes in fluid communication therewith and having sufficient strength to afford structural rigidity to said radiator structure to resist anticipated hoop stresses, a plurality of longitudinally extending conduit headers spaced about the circumference of said radiator structure and rigidly secured in fluid communication with said circumferential headers, said longitudinal headers having sufficient strength to lend axial structural rigidity to said radiator structure, means for supplying a heated fluid to said longitudinal headers and for removing cooled fluid from said cooling tubes, finned radiative means extending along the length of each of said cooling tubes and secured in good heat transfer relation thereto, the lateral edge portions of each of said finned means being in substantial engagement with the respective lateral edge portions of adjacent finned members to afford a substantially continuous radiative surface about the circumference of said radiator structure and to provide a mechanical shield for the protection of said tubes and said conduits and like equipment contained within said radiator structure, a first thermally emissive material forming at least part of the finned means and coextending with the radiative surface thereof, said first emissive material having a relatively high coefficient of emissivity, a second emissive material deposited upon said first emissive material and substantially coextending therewith, said second emissive material being relatively thin and having appreciable vapor pressure at operating temperatures of said radiator structure to cause said second emissive material to evaporate therefrom after a period of operation, said second emissive material having a relatively low coefficient of emissivity so that the emissivity of said radiator structure is altered after said operational period.

References Cited

UNITED STATES PATENTS

| | | |
|---|---|---|
| 2,908,455 | 10/1959 | Hoadley. |
| 3,014,353 | 12/1961 | Scully et al. _____ 62—239 X |
| 3,022,190 | 2/1962 | Feldman _____ 117—132 |
| 3,138,009 | 6/1964 | McCreight _____ 62—239 X |
| 3,174,537 | 3/1965 | Meyer _____ 165—133 X |
| 3,217,797 | 11/1965 | Fitton _____ 165—134 |

ROBERT A. O'LEARY, *Primary Examiner.*

MEYER PERLIN, *Examiner.*

M. A. ANTONAKAS, *Assistant Examiner.*